United States Patent [19]

Bjorklund et al.

[11] 3,954,222

[45] May 4, 1976

[54] WATER MIXER

[76] Inventors: Curt Arnold Bjorklund, Box 99;
Assar Thomasson,
Herralyckedreven 28, both of
Ulricehamn, Sweden

[22] Filed: June 6, 1974

[21] Appl. No.: 476,819

Related U.S. Application Data

[63] Continuation of Ser. No. 263,817, June 19, 1972, abandoned.

[30] Foreign Application Priority Data

June 22, 1971 Sweden.............................. 8071/71

[52] U.S. Cl............................ 236/12 R; 236/101 A;
137/605
[51] Int. Cl.².......................................... G05D 11/16
[58] Field of Search....................... 236/12, 99, 101;
137/605, 90

[56] References Cited
UNITED STATES PATENTS

| | | | |
|---|---|---|---|
| 2,069,040 | 1/1937 | Lodder | 236/12 |
| 2,211,481 | 8/1940 | Scott | 236/12 |
| 3,595,475 | 7/1971 | Morton | 236/101 |

*Primary Examiner*—William E. Wayner
*Attorney, Agent, or Firm*—Fred Philpitt

[57] ABSTRACT

A water mixer with a hot and a cold water inlet and one outlet, comprising a longitudinal housing with a longitudinal control reed swingable to throttle one inlet and widen the other one at the same time and vice versa.

14 Claims, 8 Drawing Figures

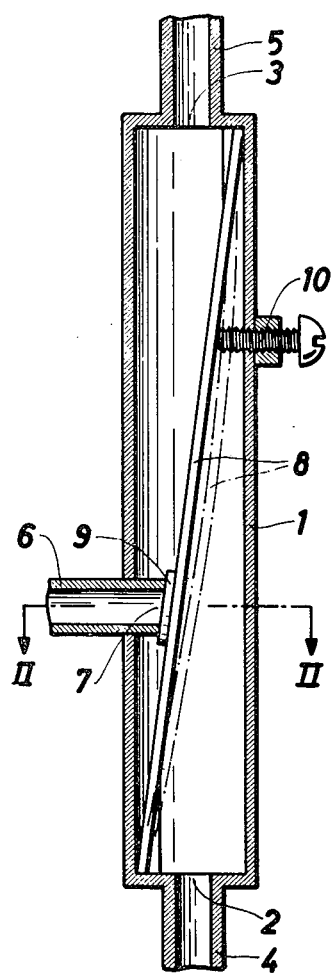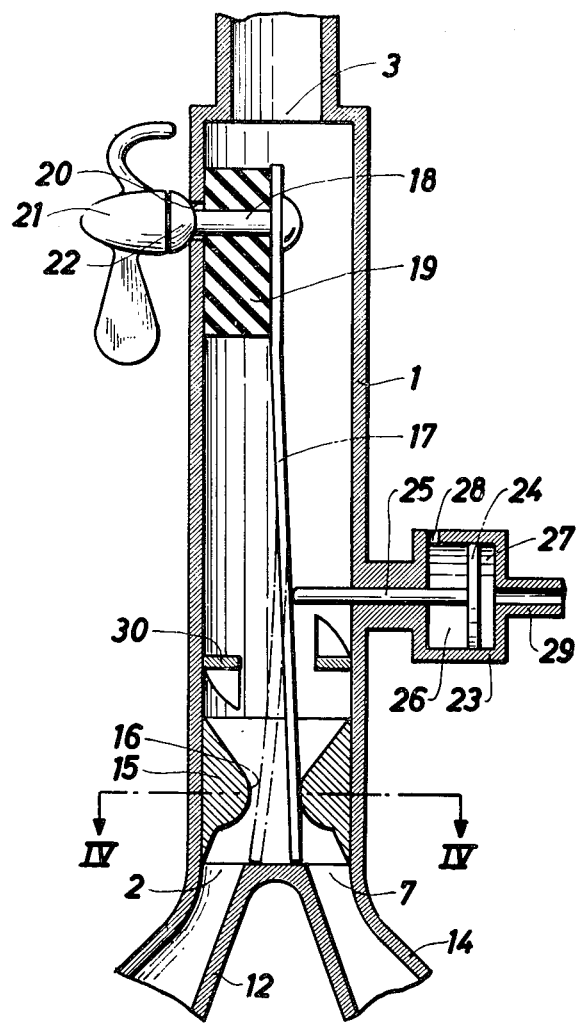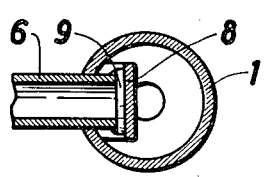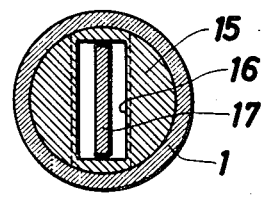
FIG. 1     FIG. 3
FIG. 2     FIG. 4

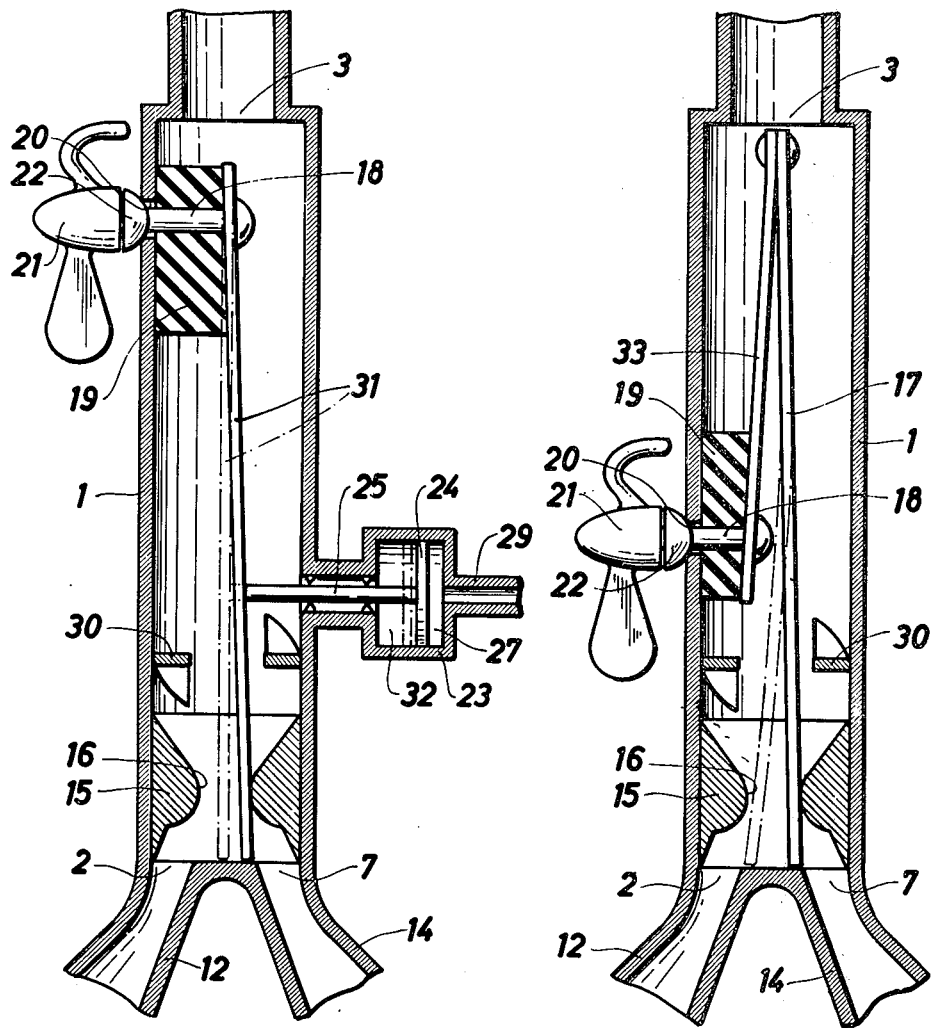
*FIG. 5*  *FIG. 6*
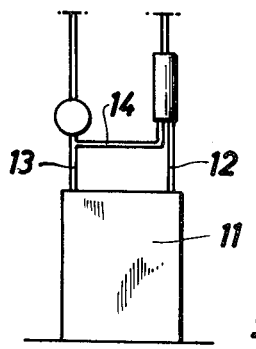
*FIG. 8*

WATER MIXER

This is a continuation of application Ser. No. 263,817, filed June 19, 1972, now abandoned.

This invention relates to a water mixer comprising two inlet ports, one for hot water and one for cold water, and one common outlet port.

The invention has as its object to bring about a water mixer of simple design and giving rise to very small differences in the temperature of the outgoing water stream.

This object has been achieved by the invention subject matter, which is characterized in that said ports open into a longitudinal housing, in which a longitudinal control reed is adapted to be swung such that the passage for the water flowing through one of said inlet ports is throttled whilst the passage for the water flowing through the second inlet port is widened, and vice versa, thereby adjusting the temperature of the water stream passing through the outlet port.

Some embodiments of the invention subject matter are described in the following with reference to the accompanying drawings, in which FIG. 1 shows a longitudinal section of a water mixer constructed according to the invention, FIG. 2 is a cross-section along the line II—II in FIG. 1, FIG. 3 is a longitudinal section corresponding to FIG. 1 through a water mixer according to another embodiment, FIG. 4 is a section along the line IV—IV in FIG. 3, FIG. 5 is a longitudinal section through a water mixer according to a further variant, FIG. 6 is a longitudinal section through still another variant of a water mixer constructed according to the invention.

FIG. 8 shows in a schematical way a water mixer according to the FIGS. 3–7 mounted in a central heating system.

Figure 7:
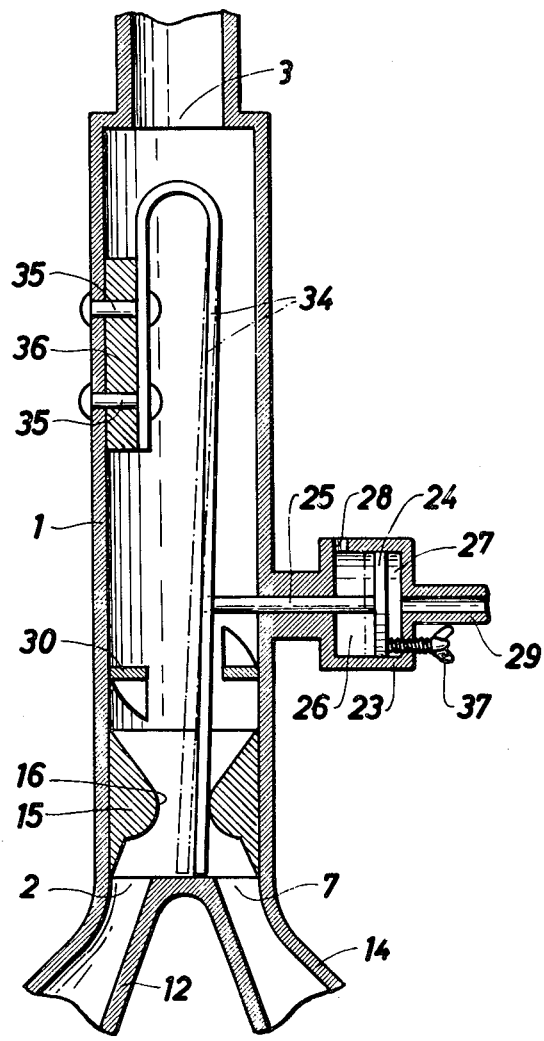
FIG. 7 is a longitudinal section through a last variant of an embodiment.

The water mixer shown in FIGS. 1 and 2 comprises a longitudinal, preferably cylindric housing 1, which at one end is provided with an inlet port 2 for hot water and at its other end with an outlet port 3 for water mixed in the housing 1. The inlet port 2 and outlet port 3 are formed by the mouth of a hot water conduit 4 and, respectively, a conduit 5 for outgoing water. 6 designates a cold water conduit extending through the wall of the housing and opening into the housing 1 by means of an inlet port 7 located some distance inwardly of said housing. 8 designates a control reed extending diagonally through the mixing housing 1 such that the inlet port 2 and outlet port 3 are located each on one side of the reed 8. Said reed 8 consists of bimetal and is turned such as from a position, in which it abuts a sealing ring 9 surrounding the inlet port 7, i.e. from the position shown by fully drawn lines in FIG. 1, upon heating of the reed is swung in the direction away from the inlet port 7, i.e. to the position indicated by broken lines. The reed 8 can be pre-set by an adjusting screw 10 screwn into the wall of the housing 1 and abutting with its end the remote surface of the reed 8 relative to the inlet port 7 at some distance from one end of the reed. Upon the release of hot water from the inlet port 2 through the housing 1 past the reed 8, the reed is swung in the direction away from the position indicated by fully drawn lines in FIG. 1, i.e. from its position covering the inlet port 7. Thereby also cold water is allowed to flow into the housing 1 through the inlet port 7. The reed continues to swing in the direction away from the inlet port 7 until a state of balance has been achieved. At a constant temperature of the water inflowing both through the port 2 and the port 7, a definite mixing proportion is obtained which implies a constant temperature of the water flowing through the outlet port 3. The position into which the reed 8 is to swing for obtaining said state of balance, can be set optionally by the adjusting screw 10. Thereby also the temperature of the outflowing water is set, in such a way, that by screwing in the adjusting screw the temperature of said water is increased and by screwing the adjusting screw in opposite direction the water temperature is decreased.

The variant of the water mixer embodiment shown in FIGS. 3 and 4 is particularly adapted for use at central heating systems. In FIG. 3 the water mixer housing in its entirety is given the same reference numeral 1 as at the variant shown in FIG. 1. Similarly, the hot water inlet port is designated by 2, the cold water inlet port by 7, and the outlet port by 3. When being mounted in a central heating system, the water mixer preferably is to be installed as schematically shown in FIG. 8. In FIG. 8 a boiler is designated by 11, The riser extending from the water heater of the boiler is designated by 12. The down conduit entering said water heater is designated by 13. A shunt conduit constituting a communication between the down conduit 13 and the inlet port 7 of the water mixer which in this case acts as a shunt, is designated by 14. The riser 12 opens into the inlet port 2. A throttle valve 15 mounted in the lower portion of the mixing housing is designed such that the opening 16 through the valve has rectangular shape, as appears most clearly from FIG. 4. In said opening 16 the lower portion of a longitudinal control reed 17 is located. The control reed 17 is fixed near its upper end at the mixing housing 1 by a bolt 18 passed through the control reed, a distance block 19 preferably of rubber, and a bore 20 in the housing wall. The bolt 18 is tightened by a nut 21. 22 designates a semi-spherical inset body abutting with its spherical surface the outer boundary edges of the bore 20 and, thus, with its plane surface facing the nut 21. Between the inset body 22 and nut 21 preferably an axial bearing is placed for facilitating the turning of the nut 21. The rubber block 19 is disposed eccentrically relative to the bolt 18, which implies that the reed 17 is swung in clockwise direction when the nut 21 is tightened at the location of the block 19 shown in FIG. 3, i.e. when said block is located with its greater part below the bolt 18. At the embodiment shown in FIG. 3, the control reed 17 consists of bimetal and is turned such that upon its heating its lower end portion is swung in the direction to its position indicated in the drawing by broken lines. When the mixer is in operation, said swinging is counteracted slightly due to the expansion by heat of the rubber body 19, i.e. said body tends to swing the control reed counterclockwise. 23 designates an internal cylindric housing with a piston 24 movably mounted therein. From said piston 24 extends a push rod 25 through the wall of housing 1 and abuts with its free end a plane surface of the control reed 17 on the same side as the shunt water inlet port 7. Said piston 24 divides the interior of the housing 23 into two chambers 26 and, respectively, 27. The chamber 26 communicates with the outside air via an aperture 28 in the wall of the housing 23. The chamber 27 communicates via a conduit 29 with an additional chamber (not shown), which may be located indoors or outdoors and constitutes a means scanning the indoors and, respectively, outdoors temperature. Said scanning means is filled with a liquid, which also fills the conduit 29 and chamber 27. Upon heating of the scanning body and resulting expansion of the control liquid, the piston 24 and thereby also the push rod 25 are displaced to the left in FIG. 3. Hereby the control reed 17 is forced to swing clockwise with its lower end portion, i.e. from the position indicated by fully drawn lines. At idle shunt valve, the control reed 17 is in its position indicated by fully drawn lines, i.e. in the position in which substantially hot water is passed through the mixing housing 1 past the control reed. Upon heating of the control reed 17, the reed swings to the position indicated by broken lines, i.e. the liquid flowing into the mixing housing consists to an ever increasing part of the shunt water. The expansion by heat of the rubber block 19 has to some extent a retarding effect on the swing movement of the reed 17, which movement continues until a state of balance has been obtained. In this state a substantially constant temperature of the water flowing through the outlet port 3 is maintained, when the relation between the temperature of the shunt water and hot water is relatively constant. The volume of said body scanning the inner or outer temperature preferably can be adjusted manually, thereby rendering it possible to adjust the state of balance of the reed 17, and thereby the temperature of the outgoing water, as desired. The system may possibly comprise a combination of two scanning bodies communicating with each other, one body located outdoors and the other one indoors. By such an arrangement the temperature of the outgoing water very smoothly adjusts to the variations in the outdoors temperature. 30 designates stirring members mounted in the mixing housing to assist in an effective mixing of hot and cold water in the mixing housing. The arrangement can be made to operate satisfactorily although the play between the control reed 17 and passageway 16 in transverse direction of the reed is relatively large.

In FIGS. 5–7 the details common to the water mixers shown in these Figures and in FIG. 3 are given corresponding reference numerals. Different from the water mixer according to FIG. 3, the control reed 31 is not made of bimetal. The chamber 32 in the cylinder 23 is sealed against the ambient and communicates with the mixing chamber 1. At this arrangement heat is transferred from the water in the mixing chamber to the control liquid 27 via the piston 24, which in this case is made of heat conducting material. The piston 27, of course, may be replaced, within the scope of the inventive idea, by, for example, a diaphragm. At the embodiment shown in FIG. 6 the bimetal reed 17 is supported by the bolt 18 via an additional reed 33 of upward extension. Thereby the reed 17 can be given greatest possible length. In this case the rubber block 19 is placed with its greater part above the bolt 18. This water mixer can be adjusted by the nut 21, but is generally not controlled from outside.

FIG. 7 shows a water mixer provided with a control reed 34 not made of bimetal. The reed, besides, is rigidly mounted at its upper end portion on the wall of the housing 1 by means of two rivets 35 and kept at some distance from the housing wall by means of a spacer 36 through which said rivets 35 extend. 37 designates an adjusting screw for setting the desired maximum temperature.

The valve shown in FIG. 5, for example, is fully controlled by the scanning body and particularly adapted for use in central heating systems, which are not provided with radiator valves or at which radiator valves are installed in the storeys but not in the basement. For effecting an increase in temperature one may, for example, turn a wheel on the control box of a central thermostat and thereby bring about a volume increase in said box, which communicates with the chamber 27 in the control cylinder. Thereby a liquid amount corresponding to the desired temperature difference flows into said box. This overflow of liquid takes place by action from the piston 24, on which the control reed 31 applies a pressure via the push rod 25. Said pressure is effected by the rubber block 19 and results in a counterclockwise swing movement of the control reed 31, which implies an increase of hot water inflow and simultaneously a reduction of shunt water inflow. When the temperature approaches the set value, a heat transfer from the mixed water to the control liquid has taken place via the walls of the control cylinder and the piston 24 and has increased the temperature of the control liquid. Due to the expansion caused by the heating of the control liquid, the piston 24 is moved to the left and thereby the control reed 36 is swung clockwise to a position in which the hot water supply is somewhat throttled. At practical tests it has proved highly suitable to place the scanning body outdoors, as thereby a very good response of the control was obtained, specially in systems without radiator valves.

The shunt valve shown, for example, in FIG. 3 is particularly adapted for use in central heating systems, which entirely or partially are controlled by radiator valves, in which systems a highly uniform starting temperature of the shunted water is obtained. The rubber block 19 being suitably dimensioned, the bimetal reed acts as an acceleration element at a rapidly occurring increase in heat demand. Also in this case control takes place from a scanning body. The shunt valve according to FIG. 3 can advantageously be utilized for finely adjusting the heat outflow to systems, at which the supply of certain rooms with sufficient shunted water was found to be difficult. At systems controlled by radiator valves a high starting temperature of the shunt water, i.e. about 45°–55°C, is required for a satisfactory operation of the systems. At tests carried out with the shunt shown in FIG. 3 no appreciable inconveniencies have been observed at high or low outdoors temperatures, and the bimetal reed has maintained a highly accurate indoors temperature.

The invention is not restricted to the embodiments described above and shown in the drawings by way of example, but it can be varied as to its details within the scope of the following claims. A suitable combination of the different types with each other lies within the scope of the invention. The mixers shown are not bound to just that position shown in the drawings, but they may also be turned into other directions.

We claim:

1. A water mixer comprising in combination
   a. a main housing,
   an inlet port for hot water located in one portion of said housing,
   c. an inlet port for cold water located in another portion of said housing, d. an outlet port for water located in a portion of said housing which is spaced apart from both of said inlet ports, e. a fluid flow passageway extending between said inlet ports and said outlet port, f. an elongated reed positioned within said main housing, 1. said reed having a first portion thereof fixedly mounted to the inside wall of said main housing by an adjustable fastener means with a spacer block composed of resilient and heat expansible material for exerting an influence on said reed due to changes of temperature, said material being interposed between said first portion of said reed and the inside wall of said main housing, whereby the reed at a rough setting of the mixer can be moved to a desired swinging position by adjustment of said fastening means, 2. said elongated reed having a second portion which is
   A. spaced apart from said first portion,
   B. free to have limited movement across the cross section of said fluid flow passageway that is adjacent to said inlets, and g. a member located in a passageway extending from the outside of said main housing into the interior of said main housing, the end of said member that is inside the main housing being adapted to at least periodically contact said elongated reed at a point intermediate the first and second portions of said elongated reed, and the end of said member that is outside of said main housing being adapted to receive forces applied externally of said main housing and to translate said forces into movement of said member in said passageway which extends from the outside of said main housing into the interior of said main housing, whereby movement of said reed across the cross section of said fluid passageway will vary the ratio of hot to cold water flowing to said outlet port.

2. A water mixer according to claim 1 wherein said spacer block is disposed unsymmetrically in relation to a bolt which supports the reed and said spacer block at the housing wall and extends through the latter (when seen in the longitudinal direction of the reed) whereby the reed at a rough setting of the mixer can be moved to a desired swinging position by tightening or untightening said bolt connection due to the difference between the forces required for compression on one side and, respectively, on the other side of the bolt.

3. A water mixer according to claim 1 wherein said spacer block is disposed unsymmetrically in relation to the fastening means.

4. A mixer according to claim 1 wherein said elongated reed is composed of a bimetal body.

5. A mixer according to claim 1 wherein the member set forth in (g) is adjustable in its movement within its passageway.

6. A mixer according to claim 1 wherein the member set forth in (g) is moveable through its passageway in response to a temperature sensitive means located outside of said main housing.

7. A mixer according to claim 5 wherein said elongated reed is composed of a bimetal material.

8. A mixer according to claim 6 wherein said elongated reed is composed of a bimetal.

9. A water mixer according to claim 1 characterized in that two inlet ports are located at one end of the housing and that the reed is supported at its opposed end so that its end portion located closest to the inlet ports can be swung into one or the other direction for varying the relation between the flow areas of the inlet ports relative each other.

10. A water mixer according to claim 1 characterized in that said member that extends outside the main housing is connected to a wall within a container, said wall being in direct contact with and movable by a fluid that changes its volume in response to temperature changes external to the main housing, such change in volume causing a movement of said wall and a movement of said member.

11. A mixer according to claim 10 wherein there is fluid on both sides of said wall.

12. A mixer according to claim 10 which additionally contains manual means for varying the volume of said fluid.

13. A water mixer comprising in combination a. a main housing, b. an inlet port for hot water located in one portion of said housing, c. an inlet port for cold water located in another portion of said housing, d. an outlet port for water located in a portion of said housing which is spaced apart from both of said inlet ports, e. a fluid flow passageway extending between said inlet ports and said outlet port, and f. an elongated reed positioned within said main housing, 1. said reed having a first portion thereof fixedly mounted to the inside wall of said main housing by an adjustable fastener means with a spacer block composed of resilient and heat expansible material for exerting an influence on said reed due to changes of temperature, said material being interposed between said first portion of said reed and the inside wall of said main housing, whereby the reed at a rough setting of the mixer can be moved to a desired swinging position by adjustment of said fastening means, 2. said elongated reed having a second portion which is
   A. spaced apart from said first portion,
   B. free to have limited movement across the cross section of said fluid flow passageway that is adjacent to said inlets.

14. A water mixer comprising in combination a. a main housing, b. an inlet port for hot water located in one portion of said housing, c. an inlet port for cold water located in another portion of said housing, d. an outlet port for water located in a portion of said housing which is spaced apart from both of said inlet ports, e. a fluid flow passageway extending between said inlet ports and said outlet port, and f. an elongated reed positioned within said main housing, 1. said read having a first portion thereof fixedly mounted to the inside wall of said main housing by an adjustable fastener means with a spacer block composed of resilient and heat expansible material for exerting an influence on said reed due to changes of temperature, said material being interposed between said first portion of said reed and the inside wall of said main housing, whereby the reed at a rough setting of the mixer can be moved to a desired swinging position by adjustment of said fastening means, 2. said elongated reed having a second portion which is
   A. spaced apart from said first portion,
   B. free to have limited movement across the cross section of said fluid flow passageway that is adjacent to said inlets, which part of said fluid flow passageway being defined by a generally rectangular opening in cross section with two pairs of mutually opposite, parallel sides, the width of said reed being only slightly smaller than the distance between one pair of said mutually opposite sides of said generally rectangular opening, the thickness of said reed being substantially smaller than the distance between the other pair of opposite sides of said generally rectangular opening.

* * * * *